Patented Nov. 29, 1949

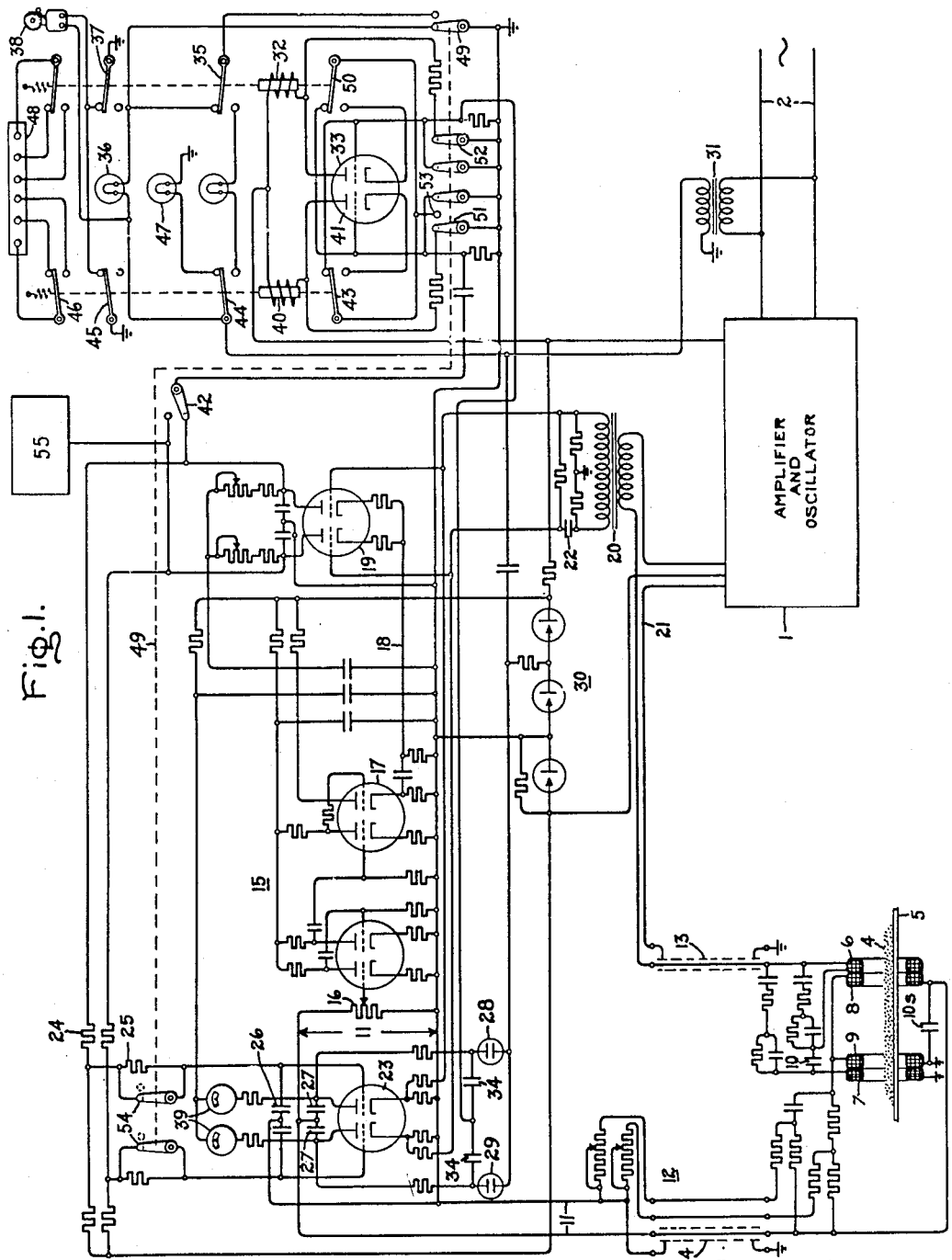

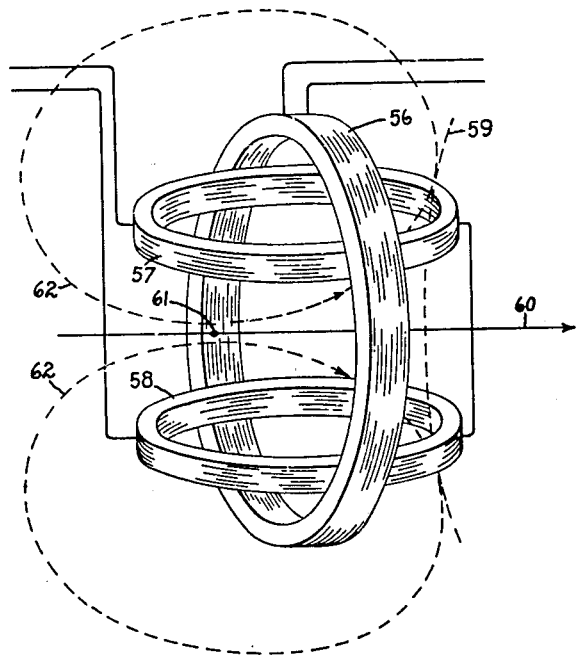

2,489,920

UNITED STATES PATENT OFFICE 2,489,920

METAL DETECTOR

Philip C. Michel, Schenectady, N. Y., assignor to General Electric Company, a corporation of New York Application July 3, 1946, Serial No. 681,327

5 Claims. (Cl. 175—183)

My invention relates to highly sensitive apparatus for detecting small particles of metal in nonmetallic material. For example, nonmetallic material, chiefly cork, is used in the manufacture of linoleum. However, small foreign particles of metal accidentally may be included in the ground-up cork as it is fed to the processing mill and if not detected and removed, may cause damage to the machinery or the finished product or both. My invention is useful in such instances for detecting and giving a warning signal when a harmful metal part is present in such material as the material is passed through a detecting coil system included in the apparatus embodying my invention.

The features of my invention which are believed to be novel and patentable will be pointed out in the claims appended hereto. For a better understanding of my invention reference is made in the following description to the accompanying drawings in which Fig. 1 represents a wiring diagram of the complete detecting system; and Fig. 2 represents a perspective view of a primary and secondary detector coil system which may be employed in place of the detector coil system of Fig. 1.

Referring now to Fig. 1, the apparatus will generally include a power supply unit 1 for providing a substantially constant frequency sine wave alternating current voltage of substantially constant value. This may comprise a conventional electronic amplifier and oscillator system supplied from a commercial frequency source 2. The oscillator of this unit is selected to produce the frequency desired for the detecting apparatus. For instance, when used primarily for detecting magnetic metal parts, a power supply of 150 cycles is suitable and when used primarily for detecting nonmagnetic metal parts, a frequency of 5000 cycles or above will be desirable. The apparatus includes a detecting coil system through or adjacent to which the material 4 under test is passed as by means of a belt or chute indicated at 5. The coil system diagrammatically illustrated in Fig. 1 includes a primary winding preferably divided into sections 6 and 7 and secondary winding coil sections 8 and 9. The primary coil sections are supplied in series from the constant frequency constant voltage sine wave source 1, and this primary winding circuit is tuned to resonance with the supply frequency by means of capacitance represented at 10.

The secondary coils, also tuned to resonance by a condenser 10s, are connected in series opposition to output leads 11 and are balanced so as to produce no net output voltage except when the primary field is distorted by the introduction of some foreign metal particle. The primary flux from both sections is in the same axial direction at any instant, producing equal and opposite voltages in the secondary coils. If, however, a magnetic particle enters from the left first into coils 7 and 9, more primary flux will thread secondary coil 9 than threads secondary coil 8. On the other hand, if the particle be nonmagnetic but a conductor, eddy currents will be produced therein which will cause more primary flux to thread coil 8 than threads coil 9. In either case there is an unbalance of the secondary coil system. Also the magnetic particle reduces the reluctance of the coil system while the conductor particle increases the reluctance of the coil system. This difference results in a difference in the phase angle of the resulting unbalanced secondary voltage in the two cases, which difference is detected by a phase discriminating detector to be explained. Associated with the secondary output are condenser and adjustable-resistance elements generally designated at 12 to assist in obtaining such balance precisely. Both the primary input and the secondary output to the detector-coil system are shielded as indicated at 13 and 14, to minimize the effect of stray and distributed capacitance. Radio frequency networks in the nature of filters are associated with the primary coils 6 and 7, as shown, for the purpose of so balancing the stray currents drawn by asymmetrical internal ground capacities and their losses that the spatial distribution of the primary's field will be substantially independent of frequency. The actual current distribution in coils 6 and 7 is maintained at least one order of magnitude closer to identical over the frequency drift range of the current supply by this expedient. The secondaries 8 and 9 are closely balanced by design and construction and may be manually substantially completely balanced by adjustable resistances included at 12. When present, the outgoing signal on lines 11 is amplified by an electronic amplifier 15 having sensitivity control 16 and represented as having four stages, the last stage 17 of which acts as a driver and substantially symmetrical limiter of the cathode follower type and from which the amplified signal is passed over connection 18 to the cathodes of a dual phase-sensitive electronic detector tube 19. It is to be noted that the two grids of the tube 19 are supplied with voltages from the secondary of a transformer 20, the primary of which is connected in series with the supply circuit 21 between the constant frequency power supply unit 1 and the primary winding 6—7 of the detector coil system. Hence, the grid voltages of detector tube 19 will have fixed phase-relations with respect to that supplying the detector coil system, and hence, be sensitive to the phase of any signal voltage output from the secondary coils 8 and 9. Furthermore, the left grid of tube 19 is connected to transformer 20 through a phase shifting condenser 22 while the right grid does not have such phase shift in its supply lead. The detector tube is supplied from driver 17 with a voltage in phase with the signal voltage when any signal is coming through. By reason of this arrangement the right side of detector tube 19 will detect signal voltages which are in phase with the power supply current of line 21, and the left side of tube 19 will detect signal voltages which are 90 degrees lagging with respect to the current of line 21. If a magnetic particle in the material 4 passes through the detector coil system, it produces a signal voltage in phase with the primary current input through line 21 and of a magnitude proportional to the size or effect of such magnetic particle. If the metallic particle is nonmagnetic and conductive, as for instance, a piece of solder or copper, the output voltage of the detector coil system is out of phase and lagging with respect to the primary current and of a magnitude proportional to the size or effect of such particle. The phase sensitive detector triodes in tube 19 will therefore distinguish between such particles, the right side of tube 19 being sensitive to inphase signals caused by magnetic particles and the left side being sensitive to leading quadrature phase signals caused by nonmagnetic current conducting particles. It is of course possible that a single particle or two particles in the detector coil at the same instant may produce some of both types of signals.

The pair of triodes in tube 23 in the upper left of Fig. 1 serves as a drift compensator and introduces correction into the signal voltage caused by slow drift of the detector system to an unbalanced condition not caused by metallic particles but due to other causes. It is noted that the grid of the right-hand triode of the drift compensator tube 23 is connected to the plate of the right-hand triode of detector tube 19. This connection is made through a circuit having a long time constant obtained by the use of high resistances 24 and 25 and a suitably large condenser 26. Likewise, the grid of the left triode of compensator tube 23 is connected to the plate of the left detector triode of tube 19 through a connection having a long time constant. The triodes in tube 19 are normally substantially conducting only during their grids' positive half cycle and those in tube 23 are normally conducting to a degree providing approximately half the available transconductance. The plate outputs of compensator tube 23 are capacitively coupled to the signal input to amplifier 15 by suitably large condensers at 27. The drift compensator tube 23 does not respond to signals caused by metallic particles passing through the detector coils at 8 and 9 because such signals are quite rapid. However, the drift compensator does respond to a slow drift of the signaling circuit 11 to an unbalanced condition. Thus, if the right side of tube 19 is continually passing more (or less) than normal current, its plate voltage is lowered (or raised), lowering (or raising) the voltage on the right-hand grid of compensator tube 23 which then reduces (or increases) current flow in the corresponding triode and subtracts from the inphase (or 180° out of phase) input voltage introduced in amplifier 15 through sensitivity control at 16. This subtraction is due to the impedance drop of A.-C. component of plate current of said triode of tube 23, capacity coupled through the corresponding condenser at 27, to the impedance comprising the secondary coils 8 and 9 and their resonating capacitor 10s. It is to be noted that the compensator 23 triodes are also phase sensitive by reason of the fact that the right cathode has a nonphase shifting connection to the secondary of transformer 20 and the left cathode has a phase shifting connection to the secondary of transformer 20 through condenser 22, while the grids of the compensator 23 respond to the phase sensitive output voltages of the two triodes of tube 19. Hence, both inphase and lagging out of phase voltage drifts of the system are compensated for. This compensator 23 provides for obtaining an initial balance of the detector coil system several hundred times closer to zero than is possible with the stepwise adjustable resistances at 12 and maintains this balance over long periods of time during which thermal conditions and the like might otherwise gradually unbalance the detector, produce overload on the amplifier and either produce a false alarm or render the detector insensitive. The phase discriminating detector tube 19 is capable without overload of running the drift compensator bias below cutoff and also above grid current values which represent limiting values beyond which the compensators cannot do their job. Means are provided to prevent out of range operation of the compensators and to give an alarm when out of range operation is approached.

A neon lamp (see lamps 28 and 29) is connected from each compensator plate to a direct current potential, obtained by a glow tube voltage regulator at 30, which potential is approximately midway between the plate supply voltage and the value of plate voltage of tube 23 at the start of grid current. The firing potential of the neon lamp is less than the voltage developed across it as the corresponding compensator approaches either limit of safe operation, and hence, upon such approach the corresponding neon lamp breaks down and gives a selective warning to the operator so that he may rebalance the appropriate one of the two adjustable resistances at 12, and such lamps are placed so as to be readily seen by the operator. An alternating voltage ripple is also introduced into the neon lamp circuits from transformer 31 which supplements the direct current voltage in producing the tripping action of the neon lamps and also serves as an A.-C. warning signal which is coupled to the signal relay operating tube 33 by the breakdown of either neon lamp, independent of polarity of breakdown voltage. A breakdown of a neon lamp thus causes the operation of a signal relay 32, shown in the upper right of Fig. 1. This relay has a coil which is normally energized because connected in the plate circuit of a normally conducting tube 33. The grid control of this tube is coupled with both neon tubes 28 and 29 through condensers 34 and the arrangement is such that when either neon tube breaks down, and regardless of direction of breakdown current, the relay 32 is deenergized. The relay when deenergized moves a contact 35 to close the circuit of a signal lamp 36, also a contact 37 to close the circuit of an audible alarm 38. The current indicating instruments 39 shown connected in the plate circuits of the compensating triodes are useful in indicating current flow in these circuits for balancing purposes.

A second relay 40 is shown on the relay panel having its coil connected to be energized by a normally conducting tube 41. The grid of tube 41 may be coupled to either the inphase plate or the quadrature phase plate of discriminating detector tube 19, through a switch 42. As shown, it is coupled with the inphase side of tube 19 and as thus connected, tube 41 will be cut off and relay 40 deenergized whenever a magnetic particle passes through the detecting coils 6, 7, 8, 9. Relay 40 is represented in deenergized position. It operates several contact devices 43, 44, 45, and 46. Contact 44 lights a signal lamp 47 which will be of a different color from lamp 36. For instance, lamp 36 may be yellow and lamp 47 red. Contact 45 of relay 43 also energizes the audible signal 38. The upper contacts such as 46 of the relays are for energizing outgoing circuits 48 for signaling and control purposes and may include control means for stopping the conveyor 5 when a metallic particle is detected. When both relays are energized, a green lamp is energized through relay contacts 35 and 44.

At 49 is a manual reset switch which has for its purpose a resetting of the relays and reconditioning the apparatus following the reception of a signal of either type. The reset switch 49 is shown in reset position. It will be noted that when a relay is deenergized in response to a signal, it opens the cathode circuit of its corresponding triode at switch contacts 43 and 50. Hence, the triodes cannot be again energized until the relays are energized. When the reset switch 49 is thrown to reset position, energizing circuits for the relays are established without going through the triodes through switch contacts 51 and 52. Hence, the relays are energized and the reset switch may then be moved to the right or off position. In the latter position the contact 51 moves to a contact 53 and establishes the cathode circuits of the triodes through contacts 43 and 50, so that the tubes are again energized to maintain relays energized. Switch blade 51 moves to contact 53 before interrupting the relay circuit through the left stationary contact. In the reset position of gang switch 49 other blades thereof ground the grids of the tubes and remove any charges remaining thereon from the condenser coupling to the signaling circuits. The upper stationary contacts cooperating with relay switch blades 43 and 50 serve to prevent circuit transients initiated by proper release of either relay 43 or 40 from accidentally releasing the other relay (due to voltage surges at the grid of its controlling triode) and thereby giving false indication.

The gang switch 49 also has blades 54 which in the reset position short resistances 25 in the long time constant grid control circuits of the drift compensator 23. This reduces the time constant of these circuits so that during a reset operation the drift compensator balancing action is speeded up in order that any needed adjustment of the adjustable resistances at 12 may be made at this time and the apparatus will be in readiness for immediate operation after a resetting operation.

With switch 42 in the position shown, the apparatus will detect small magnetic particles passing through the detector coils 6, 7, 8, and 9.

With the switch 42 in the upper position connecting the relay tube 41 with the quadrature phase or left side of the phase discriminating tube 19, the apparatus will detect small metallic conductor particles passing through the detector coils 6, 7, 8, and 9. In the latter position of switch 42 the apparatus will detect metallic particles which are both magnetic and conductive to the extent of having appreciable eddy current losses therein. It it of course possible to leave the inphase detector system connected as shown for detecting magnetic materials and provide another relay system corresponding to the one designated by the rectangle 55 connected to the out of phase side of the discriminator tube 19 for detecting conductor material particles. In this case both kinds of particles will be detected.

The apparatus is highly sensitive and one having an inner diameter of 17 inches for material passage will detect small magnetic particles, such as a single steel pellet 0.09 inch in diameter regardless of its radial position while passing through the detector coils. It will also detect round particles of solder as small as 0.2 inch in diameter.

The shape and disposition of the detector coil system will depend somewhat on the application for which used. In any event the coils will be shielded electrostatically, tuned to operating frequency, and balanced electrically. The design of these air core transformer detector coils should take into consideration variables such as temperature, vibration, line voltage, frequency, proximity of other electrical and metal bodies, and the motion of metal bodies in the vicinity. While the detection of metal particles in cork for making linoleum has been mentioned, the apparatus may be used for many other purposes, such as the detection of stray metal in logs, lumber, rubber, cotton, hay, and other nonmetallic materials before this metal causes damage to the processing machinery or to the finished product.

Another detector coil system which may be used is represented in Fig. 2 and consists of a single primary coil 56 and two secondary coils 57 and 58 symmetrically positioned within the primary coil and at right angles thereto and connected in series in such manner as to be in bucking relation with respect to external influence. For example, if a stray flux represented by dotted line 59 threads the secondary coils, it will produce equal and opposite voltages therein. The primary flux of coil 56 does not produce voltages in the secondary coils unless it is distorted by the presence of magnetic or conductor particles in the material under test which passes through the primary between the secondary coils as represented by the arrow 60. Arrow 60 may also represent the axial direction of the primary flux when not distorted. If, however, a magnetic particle enters the coil system, it will distort the primary flux. Thus a magnetic particle at 61 will cause a distortion of the primary flux as represented by dotted closed lines 62, and some of this distored flux will thread the secondary coils in opposite directions causing additive voltages therein. If the particle at 61 is nonmagnetic and a conductor, the flux distortion will take a pattern trying to avoid the particle, and flux will again cut the secondary coils in opposite directions simultaneously.

In the construction and support of the coils, metals such as bolts and the like may be necessary. However, such articles of metal, if used, are taken into consideration in the initial balance of the coils and are not included in the term "foreign metal particles" as mentioned herein. Foreign metal particles are those whose presence is to be detected.

What I claim as new and desire to secure by Letters Patent of the United States is:

1. Apparatus for detecting the presence of small foreign metal particles, comprising a detector coil system having primary exciting and secondary detecting coils, an alternating current source of substantially constant voltage and frequency for exciting the primary of said coil system, said system having a pair of secondary coils normally connected and adjusted for a balanced condition such that no secondary output voltage is produced, provisions whereby material to be tested may be passed within the influence of such coils such that if a magnetic particle or particles are present the flux distribution of the coil system will be altered resulting in a secondary coil output voltage, magnetic particles producing an output voltage having one phase relation relative to the primary voltage and nonmagnetic conductor particles producing eddy currents producing an output voltage having a different phase relation relative to the primary voltage, an electronic amplifier system for amplifying the secondary output voltage of the coil system, said amplifier system including two detectors, one responsive only to amplified voltages of said one phase relation and the other responsive only to amplified voltages of quadrature phase relation, electronic tube drift compensators connected to be controlled from the outputs of said detectors through circuits having long time constants, said drift compensator tubes having output connections coupled to the input of said amplifier system for the purpose of introducing therein corrective voltages of said two phase relations to maintain the amplifier system normal input substantially at zero value, said drift compensators being nonresponsive to sudden changes in detector outputs caused by metal particle detection operation, but responsive to slow changes in the detector outputs caused by the coil system drifting out of a balanced adjustment condition.

2. Apparatus for detecting the presence of small foreign metal particles comprising a coil system having primary exciting and secondary detecting coils, an alternating current supply of substantially constant voltage and frequency for exciting the primary of said system, the secondary having two coils normally connected and adjusted to produce zero resultant output voltage when no foreign metal particle is present, provisions whereby material to be tested may be passed within the influence of such coil system such that if foreign metal particles are present the flux distribution of said coil is altered and a resultant secondary output voltage is produced, an electronic tube amplifier system for amplifying said secondary output voltage and including a detector tube, a drift compensator electronic tube having its input control coupled with the output of said detector tube through a circuit of long time constant and its output coupled to the input of said amplifier system for maintaining the amplifier normal input at zero value, said drift compensator being nonresponsive to quick output variations of said detector tube caused by foreign metal particle detection operation, but responsive to slow detector tube output changes caused by the secondary coil system drifting out of a balanced adjustment condition, an electronic relay responsive to the foreign metal particle detecting action of said detector but nonresponsive to said slow detector tube output changes, and a second electronic relay responsive to the action of said drift compensator tube when the latter approaches either limit of its compensating range.

3. In apparatus for testing material for small foreign metal particles comprising a primary and secondary coil system, a source of supply of substantially constant voltage and frequency alternating current therefor, the secondary of the system comprising a pair of similar coils connected to produce a zero resultant output voltage when no foreign metal particle or particles are present when the primary is excited from said source, provisions for passing material to be tested through the coil system such that if foreign metal particles be present therein a resultant secondary detecting voltage is produced, the primary being tuned to resonance and electrostatically shielded, and a capacitance-resistance network so associated with the primary as to reduce substantially the change in spatial distribution of field produced by asymmetrical internal ground or shield capacities and their losses as the supply frequency drifts through its range of variation.

4. Apparatus for detecting the presence of small foreign metal particles comprising an alternating current energized primary and secondary coil system adjusted and balanced to normally produce a secondary output voltage only when a foreign metal particle is brought within the influence of such coil system, an electronic amplifier for amplifying such output voltages and including a detector tube, a drift compensator electronic tube having its input control coupled with the output of said detector tube through a circuit of long time constant and its output coupled with the input control of said amplifier, said drift compensator being normally nonresponsive to quick output variations of said detector tube caused by foreign metal particle detector action thereof, but responsive to slow detector tube output changes caused by slowly changing secondary output voltages occasioned by the coil system drifting out of balanced adjustment to maintain the amplifier normal input at zero value, an electronic relay responsive to the foreign metal particle detecting action of said detector tube but nonresponsive to said slow detector tube output changes, a second electronic relay responsive to the action of said drift compensator tube when the latter approaches either limit of its compensating operating range, and a reset switch for momentarily altering the connections of said relays following a response action for reconditioning them for subsequent response action and for simultaneously momentarily reducing the time constant of the long time constant control circuit of said drift compensator tube.

5. Apparatus for detecting the presence of small foreign particles, comprising a detector coil system having primary exciting and secondary detector coils, an alternating current source of substantially constant voltage and frequency for exciting the primary of said coil system, said system having a pair of secondary coils normally connected and adjusted for a balanced condition such that no secondary output voltage is produced, provisions whereby material to be tested may be passed within the influence of such coils such that if a magnetic particle or particles are present the flux distribution of the coil system will be altered resulting in a secondary coil output voltage, magnetic particles producing an output voltage having one phase relation relative to the primary voltage and nonmagnetic conductor particles producing an output voltage having a different phase relation relative to the primary voltage, and an electronic amplifier system for amplifying the secondary output voltage of the coil system, said amplifier system including at least two detector tubes each having plate, grid and cathode electrodes, said cathodes being connected to be responsive to the amplified secondary output voltage of said coil system and the grids being energized from said alternating current source through connections which cause the voltages on such grids to be 90 degrees displaced in phase with respect to each other such that one detector is responsive to only the amplified voltages of one phase relation and the other responsive only to amplified voltages of a quadrature phase relation.

PHILIP C. MICHEL.

REFERENCES CITED

The following references are of record in the file of this patent:

UNITED STATES PATENTS

| Number | Name | Date |
| --- | --- | --- |
| 1,640,524 | Augustine | Aug. 30, 1927 |
| 2,321,355 | Berman | June 8, 1943 |
| 2,455,792 | Meunier | Dec. 7, 1948 |

FOREIGN PATENTS

| Number | Country | Date |
| --- | --- | --- |
| 476,613 | Great Britain | Dec. 13, 1937 |

OTHER REFERENCES

Electronics, January 1946, pages 105-109.